United States Patent
O'Brien et al.

(10) Patent No.: US 7,246,744 B2
(45) Date of Patent: Jul. 24, 2007

(54) USER AUTHENTICATION FOR CONTACT-LESS SYSTEMS

(75) Inventors: William G O'Brien, Orleans (CA); Tet Hin Yeap, Ottawa (CA)

(73) Assignee: BCE Inc., Montreal, Quebec (CA)

( * ) Notice: Subject to any disclaimer, the term of this patent is extended or adjusted under 35 U.S.C. 154(b) by 0 days.

(21) Appl. No.: 11/299,730

(22) Filed: Dec. 13, 2005

(65) Prior Publication Data

US 2006/0131412 A1 Jun. 22, 2006

Related U.S. Application Data

(63) Continuation of application No. PCT/CA2004/002185, filed on Dec. 22, 2004.

(51) Int. Cl.
*G06K 5/00* (2006.01)
(52) U.S. Cl. .................... 235/382; 235/382.5
(58) Field of Classification Search ............. 235/382, 235/382.5
See application file for complete search history.

(56) References Cited

U.S. PATENT DOCUMENTS

| | | | |
|---|---|---|---|
| 5,619,412 A | 4/1997 | Hapka | |
| 6,429,768 B1 | 8/2002 | Flick | |
| 6,508,400 B1 * | 1/2003 | Ishifuji et al. | 235/382 |
| 6,588,660 B1 * | 7/2003 | Buescher et al. | 235/382 |
| 6,615,175 B1 | 9/2003 | Gazdzinski | |
| 2003/0093199 A1 | 5/2003 | Mavreas | |

FOREIGN PATENT DOCUMENTS

| | | |
|---|---|---|
| CA | 2 392 229 A1 | 6/2001 |
| CA | 2 479 343 A1 | 10/2003 |

OTHER PUBLICATIONS

Jonathan Collins, RFID Journal—Tag Encryption for Libraries, http://ww.rfidjournal.com/article, Jul. 14, 2004, pp. 1-2.
Electronic Design, RFID tag reader uses FSK to avoid collisions, http://elecdesign.com/Articles, ED Online ID #6176, Oct. 28, 1999, pp. 1-7.

* cited by examiner

*Primary Examiner*—Karl D Frech

(57) ABSTRACT

A validation phase is performed at an RFID reader, in order to ascertain which of a plurality of potential candidates for authentication, are actual candidates for authentication. Once a candidate has been successfully validated, an authentication phase is initiated with a host computer, to determine whether the information presented by the candidate matches expected information about the candidate. If the authentication is considered successful, a final authorization procedure may be performed, or the authenticated candidate may be granted certain predetermined permissions. By performing the validation phase locally at the reader, the need for accessing a host computer is reduced and unnecessary queries to the host computer are avoided.

49 Claims, 8 Drawing Sheets

USER AUTHENTICATION FOR CONTACT-LESS SYSTEMS

CROSS-REFERENCE TO RELATED APPLICATIONS

The present application is a continuation of PCT Patent Application Ser. No. PCT/CA2004/002185, filed on Dec. 22, 2004 and hereby incorporated by reference herein.

The present application is related in subject matter to U.S. patent application Ser. No. 11/002,077 to William G. O'Brien et al., entitled "Security Access Device and Method", filed on Dec. 3, 2004, hereby incorporated by reference herein.

FIELD OF THE INVENTION

The present invention relates generally to contact-less access control systems and, in particular, to user authentication techniques having application in such systems.

BACKGROUND

Both passive and active RFID technologies are being used increasingly to control access, such as building access, vehicle access, etc. Typically, in an RFID-enabled system, access to a building or vehicle requires an RFID tag (hereinafter referred to simply as a tag) to be placed in proximity of an RFID tag reader (hereinafter referred to simply as a reader). The positioning of the tag vis-à-vis the reader can be done either deliberately, by flashing a tag-containing card in front of a suitable reader, or as a matter of course if the tag is embedded in a badge or under the skin. Access to the building or vehicle is then allowed only if the data stored in and received from the tag (e.g., a user ID) corresponds to an entry in a database of authorized user IDs, typically stored in a server remote from the reader.

As RFID technology gains widespread usage in an increasing number of industries, at least two problems are expected to arise in the above-described access control context. The first such problem is related to security, and is especially evident if one imagines the situation where a malicious entity gains access to the database of authorized user IDs. With this information, the malicious entity can engage in the production of tags that emulate those of the persons associated with the authorized user IDs in the database. Recognizing this deficiency, the industry has attempted to address the security problem, at least in part, through the use of encryption techniques. Specifically, instead of storing a user ID, a given tag is designed to store the user ID as encrypted by a secret encryption key. A reader reading the tag proceeds to decrypt the user ID using a known decryption key, and then compares the (decrypted) user ID to the database of authorized user IDs in the usual fashion. In this scenario, a malicious entity that gains access to the database of authorized user IDs, but without the secret encryption key, will not be able to reproduce the encrypted user ID required to permit access to the building or vehicle.

The second problem that is expected to arise is one related to volume. As RFID tag readers become more sensitive and as the number of objects possessing RFID tags increases, there may be, at any given moment, a wide array of tag-containing objects in the vicinity of a given reader. Yet the vast majority of these tag-containing objects are not intended to be submitted to the reader for access control purposes. For example, a reader positioned at the entranceway to a building may, in the future, be exposed to signals emitted by one or several (or none!) building access cards, while also being in the vicinity of hundreds of other tag-containing items (briefcases, laptops, vehicles, automobile tires, wallets, credit cards, etc.) that are completely unrelated to building access. Unfortunately, however, the reader has no way of knowing which tags are being intentionally presented to it for access control purposes, and therefore must make the assumption that each tag needs to be authenticated.

The risk of picking up signals emitted by multiple tags can only increase as the RFID industry advances on the standardization front. On the one hand, there are indications of industry preparedness, such as the development of protocols in order to manage collisions at a reader performing data acquisition (e.g., by using random back-off techniques reminiscent of LAN access protocols). However, an issue that is overlooked by these and other prior art proposals is the difficulty caused by the delay resulting from having to perform numerous queries to a database of user IDs, where such database is typically located remotely from the reader. As a result, the bandwidth between the reader and the database, as well as the computational speed of the database, become significant bottlenecks in the quest for real-time performance in an access control scenario. These bottlenecks become even more obstructive if the above-described encryption techniques are employed, as the net effect is the introduction of further delay in the process.

Against this background, it is clear that there is a need for improved access control techniques in RFID-based systems.

SUMMARY OF THE INVENTION

The present invention provides for a validation phase to be performed at an RFID reader, in order to ascertain which of a plurality of potential candidates for authentication, are actual candidates for authentication. This validation phase can be performed locally at the reader, without the need for accessing a host computer. Once a candidate has been successfully validated, an authentication phase is initiated with the host computer, to determine whether the information presented by the candidate matches expected information about the candidate. If the authentication is considered successful, a final authorization procedure may be performed, or the authenticated candidate may be granted certain predetermined permissions.

According to a first broad aspect, the present invention seeks to provide a method, comprising receiving, at a contact-less tag reader, first data transmitted by a tag; validating the first data to determine whether the first data comprises candidate data for authentication, the validating being deemed successful if the first data comprises candidate data for authentication, and unsuccessful otherwise; and responsive to the validating being deemed successful, authenticating the candidate data.

According to a second broad aspect, the present invention seeks to computer-readable media tangibly embodying a program of instructions for execution by a contact-less tag reader to perform the aforementioned method.

According to a third broad aspect, the present invention seeks to provide a contact-less tag reader, comprising an antenna; a broadcast interface for receiving a signal through the antenna, the signal comprising first data transmitted by a tag; and a control module connected to the broadcast interface. The control module is operative for validating the first data to determine whether the first data comprises candidate data for authentication, the validating being deemed successful if the first data comprises candidate data for authentication, and unsuccessful otherwise; and responsive to the validating being deemed successful, performing authentication of the candidate data.

According to a fourth broad aspect, the present invention seeks to provide computer-readable media tangibly embodying a program of instructions executable by a host computer to perform a method of authenticating tag data that has been validated on a basis of an identifier in the tag data, the tag data further comprising second data, the second data having a first portion corresponding to an index and a second portion corresponding to an encrypted version of third data. The method performed by the host computer comprises applying decryption to the second portion of the second data to obtain the third data; consulting a database at a location associated with the index to obtain fourth data; comparing the third and fourth data; and deeming authentication to be successful if the third data matches the fourth data, and unsuccessful otherwise. According to a fifth broad aspect, the present invention seeks to provide a radio frequency tag, comprising a memory storing first data, the first data comprising an identifier and second data, the identifier being known to a reader of the tag and allowing the reader to validate the tag without contacting a host, the second data comprising a first portion corresponding to an index and a second portion corresponding to an encrypted version of third data, the third data and the index being known to the host and allowing the host to authenticate the tag upon performing decryption of the second portion of the second data. The tag also comprises an antenna and a transponder operative to send a signal through the antenna, the signal being representative of the first data stored in the memory.

According to a sixth broad aspect, the present invention seeks to provide a memory storing first data for transmission by a radio frequency tag to a reader, the first data comprising an identifier and second data, the identifier being known to the reader and allowing the reader to validate the tag without contacting a host, the second data comprising a first portion corresponding to an index and a second portion corresponding to an encrypted version of third data, the third data and the index being known to the host and allowing the host to authenticate the tag upon performing decryption of the second portion of the second data.

According to a seventh broad aspect, the present invention seeks to provide a signal tangibly embodied in a transmission medium, comprising the first data comprising an identifier and second data, the identifier being known to the reader and allowing the reader to validate the tag without contacting a host, the second data comprising a first portion corresponding to an index and a second portion corresponding to an encrypted version of third data, the third data and the index being known to the host and allowing the host to authenticate the tag upon performing decryption of the second portion of the second data.

According to a eighth broad aspect, the present invention seeks to provide a method of programming a tag, comprising determining a user identifier associated with a user of the tag; determining a personal identifier associated with the user of the tag; encrypting the personal identifier with an encryption key to produce an encrypted personal identifier; determining a common identifier jointly associated with the user of the tag and other users of other tags; creating a unique tag identifier (UTI), the UTI comprising the user identifier, the encrypted personal identifier and the common identifier; and storing the UTI in a memory of the tag.

These and other aspects and features of the present invention will now become apparent to those of ordinary skill in the art upon review of the following description of specific embodiments of the invention in conjunction with the accompanying drawings.

DETAILED DESCRIPTION OF EMBODIMENTS

Figure 1:
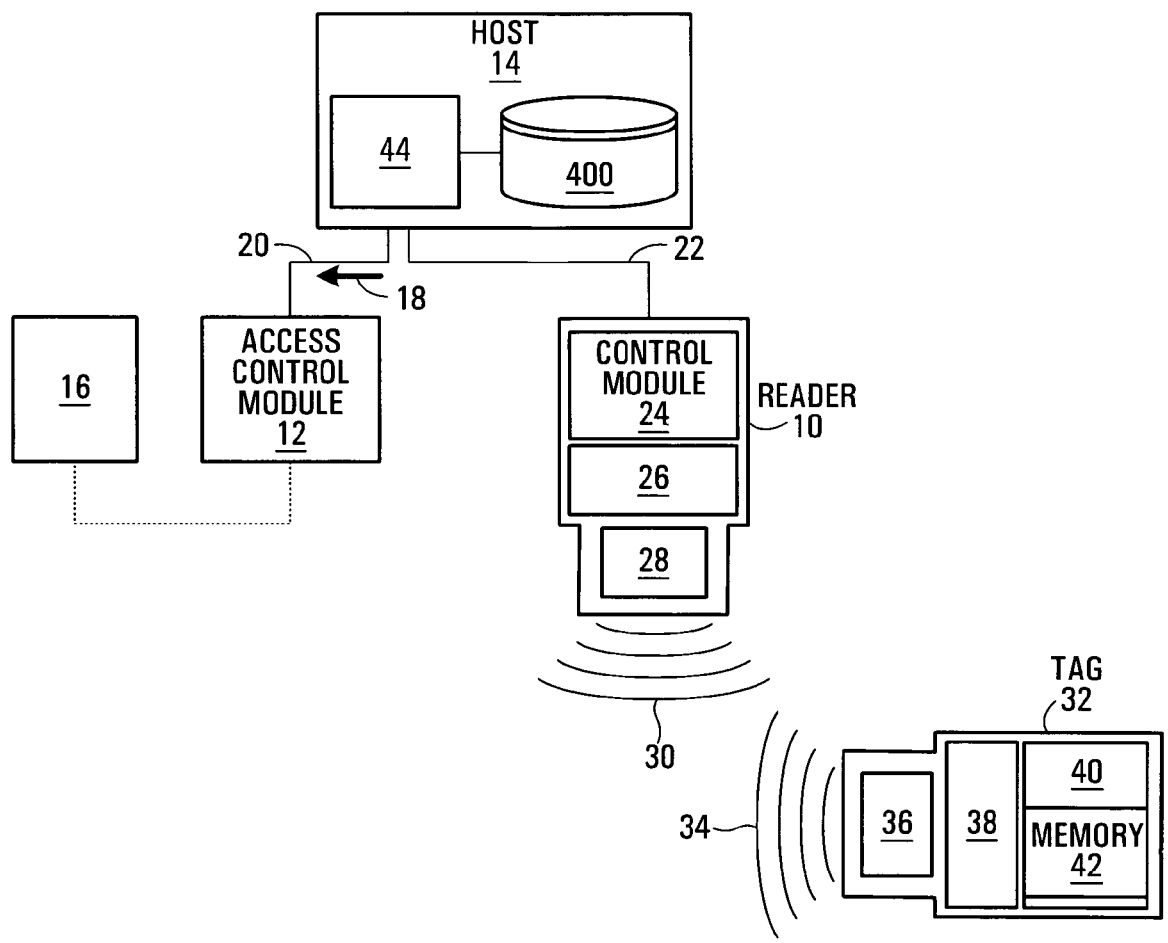
FIG. 1 shows, in schematic form, an access control system envisaged by an embodiment of the present invention.

With reference to FIG. 1, there is depicted an access control system comprising an RFID reader 10 (hereinafter referred to simply as a "reader"), an access control module 12 and a host computer 14. The access control module 12 is a device which, upon receipt of a command 18, permits access to, or usage of, a resource of interest 16. Examples of the resource of interest 16 include but are not limited to a vehicle engine, vehicle functionality (e.g. braking, ignition, gears), machinery, electronics, a building, a door (such as a door to a restricted area), a computer, a computer network, a personal digital assistant, a telephone, an Automatic Teller Machine, a switching mechanism for an electric light, a point-of-sale (POS) terminal, and so on. A specific non-limiting example of a POS terminal includes a Dexit™ reader for reading Dexit™ tags, and available from Dexit Inc., P.O Box 326, Toronto, Ontario, Canada, M5X 1E1, www.dexit.com.

Figure 2A:
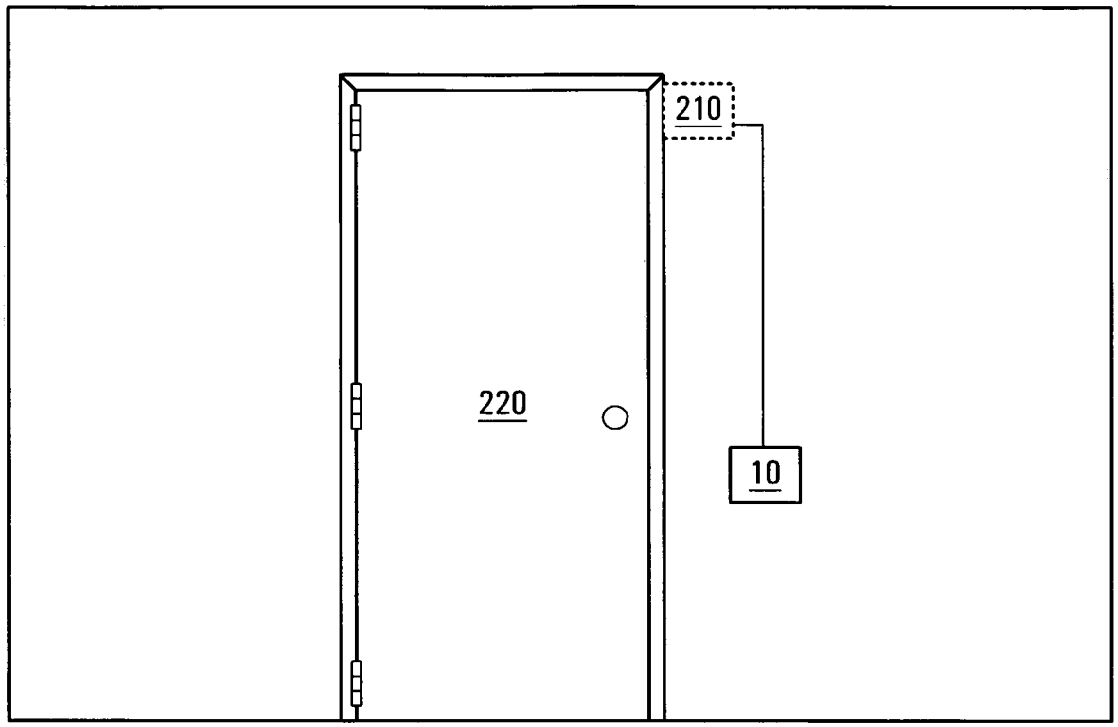
FIGS. 2A and 2B show specific scenarios where access control may be desired.

A specific non-limiting example is shown in FIG. 2A, where the access control module 12 comprises a magnetic door latch 210 which can be released upon receipt of the command 18, allowing a door 220 to be opened.

Figure 2B:
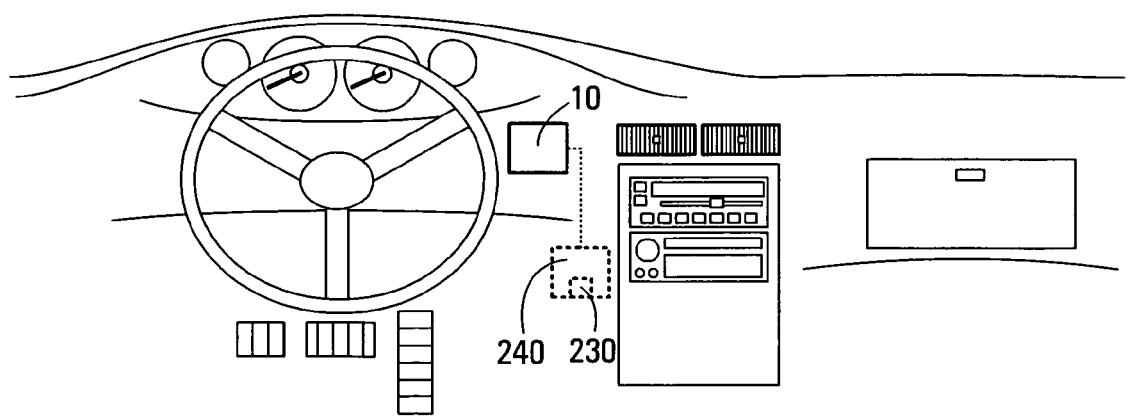

Another specific non-limiting example is shown in FIG. 2B, where the access control module 12 comprises an electrical and/or mechanical device 230 which permits a functionality 240 (e.g. braking, ignition, gears) of the vehicle to be activated upon receipt of the command 18.

Implementations that are more software-oriented may be suitable for the case where the resource of interest 16 is a computer, a computer network, a personal digital assistant, a telephone, an Automatic Teller Machine, POS terminal such as a Dexit™ reader for example, etc.

The reader 10 acts as a gateway to the access control module 12 and, ultimately, to the resource of interest 16. In one embodiment, the reader 10 and the access control module 12 are co-located in a single unit. In other embodiments, the reader 10 will be located some distance away from the access control module 12. For example, in FIG. 2A, the reader 10 is shown as being proximate a handle of the door 220, whereas in FIG. 2B, the reader 10 is shown as being mounted in the vehicle dashboard.

The command 18 to activate the access control module 12 comes from the host computer 14, which is also connected to the reader 10. The host computer 14 is typically located remotely from both the access control module 12 and the reader 10, such as in another room or building, or perhaps even in another country. Accordingly, a wide range of communication links 20, 22 can be used to connect the host computer 14 to the access control module 12 and to the reader 10. These include, without limitation, copper wire, coaxial cable, fiber optic cable, wireless airlink, infrared airlink and any combination of the foregoing.

It should also be noted that in the case of a vehicle, where the access control module 12 and the reader 10 are separated from the host computer 14 by a wireless airlink, it is expected that a wireless transceiver unit (not shown) will be provided. The wireless transceiver unit communicates with the reader 10 and/or the access control module 22 via an interface. Communications are also established between the wireless transceiver unit and the host computer, e.g., over a satellite or terrestrial network, such as a cellular telephone network, including possibly via the Internet.

As can be seen in FIG. 1, the reader 10 comprises a control module 24, a broadcast interface 26 and an antenna 28. Various types of readers can be used, including stationary, hand-held, multi-frequency, etc., without being limited to any of the foregoing. In operation, the broadcast interface 26 sends a radio-frequency query signal 30 through the antenna 28. The query signal 30, depending on its characteristics, is picked up by a nearby tag 32, which sends back an identifying response signal 34. In simple systems, the query signal 30 may be sent continually until a response signal 34 is detected at the reader 10. In more complex systems, the reader 10 may be equipped with a proximity sensor (not shown) in order to preclude emission of the query signal 30 unless a tag 32 is suspected of being in the vicinity of the antenna 28.

Various types of tags 32 are available on the market today, including passive and active tags. The common features of all tags include an antenna 36, a transponder 38 and a microchip 40 with a memory 42. One area where active and passive tags differ is that a passive tag does not have its own power source. Instead, the query signal 30 from the reader 10 comprises enough energy to charge the transponder 38 of a nearby tag 32, allowing it to recognize the query signal 30 and send back the response signal 34. Although passive tags are currently more common and less expensive, the present invention is not limited to passive tags, active tags, hybrid tags, or any particular other type of tag, whether currently existing or to be introduced in the future.

Figure 7:
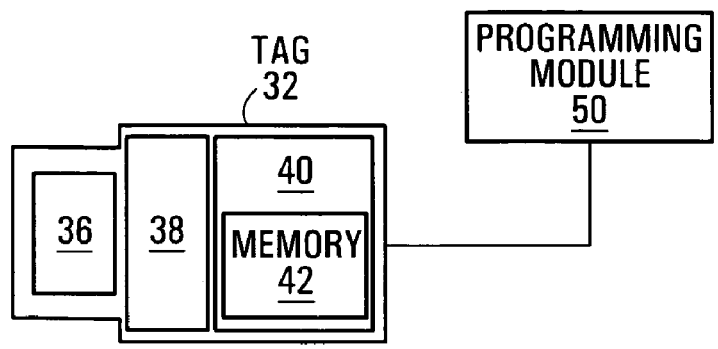
FIG. 7 shows in schematic form a tag programming module use to program a tag during a tag programming phase.

In this specific non-limiting embodiment, the response signal 34 sent by the transponder 38 through the antenna 36 is a reflection of the incoming radio frequency (RF) field as modulated by the contents stored in the memory 42 of the microchip 40. The contents of the memory 42, which can be referred to as a unique tag identifier, or UTI, are programmable by a tag programming module 50 (see FIG. 7) in a manner similar to an electrically erasable programmable read-only memory (EEPROM). At the reader 10, the response signal 34 is detected by the broadcast interface 26 and the UTI is decoded therefrom and sent to the control module 24.

It will be understood that different readers 10 and tags 32 may operate in different frequency ranges, and the present invention is not limited to any frequency range in particular. It will also be understood that many neighbouring tags may receive the query signal 30, which may cause multiple tags 32 to respond contemporaneously. To deal with this eventuality, collision-avoidance protocols have been developed to stagger the emission of response signals 34, thereby allowing the reader 10 to collect multiple response signals 34 over a short period of time.

Having thus explained the basic function of the reader 10 and the tag 32, it is now a suitable juncture to describe the basic operation of the reader 10 and its interaction with the host computer 14 for the purposes of information collecting, logging and processing.

Specifically, a feature of the control module 24 of the reader 10 is to validate nearby tags before authenticating them. In one embodiment, validation of a nearby tag 32 comprises determining whether its contents constitutes a "candidate for authentication". Only once the contents of a nearby tag are successfully validated (i.e., confirmed as being a "candidate for authentication") does the reader 10 contact the host computer 14 for the purposes of authentication. The benefit of performing validation in a pre-authentication phase is to filter out tags associated to objects or people that are not expected to be interested in accessing the resource of interest 16. Consequently, communications between the reader 10 and the host computer 14 are reduced to only those exchanges required for authentication, which occurs in those instances where a nearby tag 32 comprises contents that are confirmed as being a "candidate for authentication".

For example, in the case where the resource of interest 16 is a vehicle in a fleet of vehicles, the vehicle could be driven by any one of a number of "potential drivers" who are all, at a minimum, expected to have a prior relationship with a particular company. Of course, different scenarios and expected relationships between the potential drivers and the company will apply, depending on whether the fleet of vehicles is a rental fleet, commercial fleet, service fleet, etc., and also possibly depending on whether the vehicle is an automobile, truck, bus, railway vehicle, aircraft, boat, etc.

In the case where the resource of interest 16 is a property or building accessed via a particular doorway, the doorway could be accessed by any number of "potential entrants" who are all, at a minimum, expected to have a prior relationship with the institution whose property they are entering. Of course, different scenarios and expected prior relationships between the potential entrants and the institution will apply, depending on whether the property is a building, parking lot, room, etc.

In the case where the resource of interest 16 is a computer or computer network, access is likely to be sought by any number of "potential operators", who are all, at a minimum, expected to have a underlying prior relationship (e.g., employee, student, etc.) with the institution that operates the computer or computer network.

In the case where the resource of interest 16 is an Automatic Teller Machine (ATM) or POS terminal belonging to a financial institution or financial transaction company, access to the ATM or POS terminal could be desired by any number of "potential clients" who are all expected to have, at a minimum, a prior relationship with the financial institution or financial transaction company.

Each of these "potential users" (e.g., potential drivers, potential entrants, potential operators, potential clients, etc.) that have certain basic characteristics in common with other potential users of the same resource of interest 16 is deemed a "candidate for authentication", meaning that their presence (or, rather, their tags' presence) detected in the vicinity of the resource of interest 16 by the reader 10 should be validated locally by the reader 10, and then signaled to the host computer 14 for subsequent authentication. However, any other tag-containing devices should be filtered out, such as not to result in an unnecessary query to the host computer 14.

In order to enable desired operation to take place, the tags 32 of the potential users are programmed by a tag programming module 50 (see FIG. 7) during a tag programming phase that will now be described in some detail. To begin with, each potential user has a unique user identifier, A, as well as an associated personal identifier, B(A). Non-limiting embodiments of the user identifier, A, and the personal identifier, B(A), include alphanumeric codes that can be expressed as digital information (e.g., sequences of bits).

Figure 4:
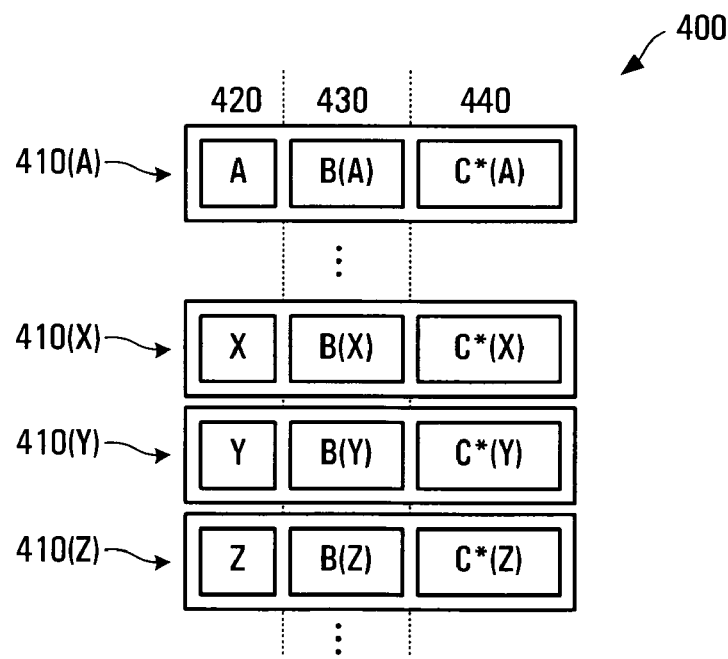
FIG. 4 shows a database at a host computer.

While the personal identifier, B(A), may or may not be known to the user associated with the user identifier, A, this information is known to the host computer 14. Specifically, with reference to FIG. 4, the host computer 14 maintains a database 400 of potential users. The database 400 of potential users comprises a plurality of records 410(j), each associated with a potential user of the resource of interest 16. A given record 410(j) in the database 400 of potential users comprises a first field 420(j) comprising the user identifier, j and a second field 430(j) comprising the personal identifier, B(j). Thus, in the case of a potential user with user identifier A, the record 410(A) will comprise a first field 420(A) containing the user identifier, A, and a second field 430(A) containing the personal identifier, B(A).

With specific reference now to FIG. 3, steps in the tag programming phase may be described as follows.

At step 302, the personal identifier, B(A), is encrypted using a key, C(A), to yield an encrypted personal identifier denoted $[B(A)]_{C(A)}$. Step 302 may be performed by the host computer 14 or by the tag programming module 50. It should be noted that the key, C(A), used to encrypt the personal identifier, B(A), is associated with a complementary key, C*(A), used to derive the personal identifier, B(A), at a later time during a decryption step. The complementary key C*(A) is assumed to have been stored in the host computer 14 in a previous step. Specifically, record 410(A) in the database 400 of potential users comprises a third field 440(A) comprising the complementary key, C*(A), which will successfully decrypt the encrypted personal identifier if it is encrypted as $[B(A)]_{C(A)}$.

At step 304, the UTI of the user's tag 32 (i.e., the contents of the memory 42) is constructed and denoted D(A). The UTI, D(A), will thus include the encrypted personal identifier, $[B(A)]_{C(A)}$, to which is appended the user identifier, A, and a "common identifier", E, shared by a subset of, or possibly all, potential users of the resource of interest 16. For example, the common identifier, E, may be unique to different financial institutions, financial transaction companies, companies, classes of employees, etc. It is noted that the common identifier, E, is useful for validation purposes, whereas the encrypted personal identifier, $[B(A)]_{C(A)}$, and the user identifier, A, will be used for authentication purposes provided that validation is deemed successful.

At step 306, the tag programming module 50 transfers the UTI, D(A), into the memory 42 of the tag 32. Thus, the memory 42 tag 32 will comprise a composite code that is partitioned into three elements, namely, $[B(A)]_{C(A)}$, A and E. It is noted that the order of appearance of these elements within the UTI, D(A), can be different in different embodiments of the present invention, but should be known to the control module 24.

At step 308, the common identifier, E, is supplied to the control module 24 of the reader 10. It should be understood that since the common identifier, E, is known ahead of time, step 308 may be executed before or after any of steps 302, 304 and 306.

Figure 5:
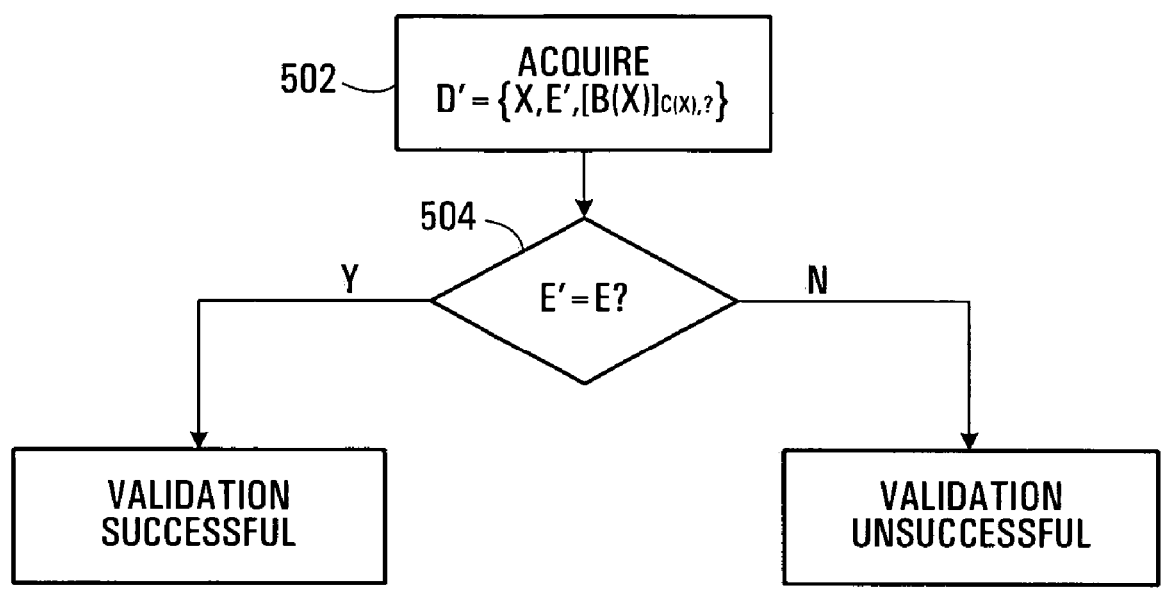
FIG. 5 is a flowchart showing steps executed in a validation stage of a method in accordance with an embodiment of the present invention.

Reference is now made to FIG. 5, where the validation phase is described in the case of an arbitrary tag 32 having been programmed in accordance with the tag programming phase described above. The tag 32, comprising an unknown UTI, denoted D', approaches the reader 10, more specifically, the antenna 28 of the reader 10.

At step 502, the reader 10 will function in the usual way to acquire the unknown UTI, D'. If the acquired UTI, D', is to have any chance of passing the validation and authentication phases, it will need to allow extraction of the following partitioned code: $\{X, E', [B(X)]_{C(X),?}\}$, where X is a purported user identifier, E' is a purported common identifier and $[B(X)]_{C(X),?}$ is a purported encrypted personal identifier. The word "purported" is used to qualify all the elements of the acquired UTI, D', since at this point, the control module 24 does not know whether D' conforms to a UTI that would have been issued by a tag worn by a potential user in the database 400 of potential users.

At step 504, the control module 24 compares the purported common identifier, E', to the known common identifier, E. Again, it is recalled that the common identifier, E, is known to the reader 10 and is common to a group (or perhaps even all) potential users in the database 400 of potential users.

If there is no match at step 504, then validation is deemed unsuccessful and the control module 24 aborts the validation phase. In other words, it is concluded that no potential user would carry a tag 32 such as the one that was detected as approaching the reader 10. That is to say, even if "X" happens to correspond to a user identifier in the database 400 of potential users, an authentication phase is not attempted, as the common identifier, E, was not found in the acquired UTI, namely D'. Thus, an unnecessary query to the host computer 14 is avoided.

However, if at step 504, it was found that the purported common identifier, E', does indeed match the known common identifier, E, then validation is deemed successful and an authentication phase is triggered. In other words, it cannot be said for sure that the tag 32 does not belong to a potential user, and hence the remainder of the information in the acquired UTI, D', is a "candidate for authentication". Accordingly, an authentication phase is initiated to authenticate the user who claims to be associated with the user identifier, X.

Figure 6A:
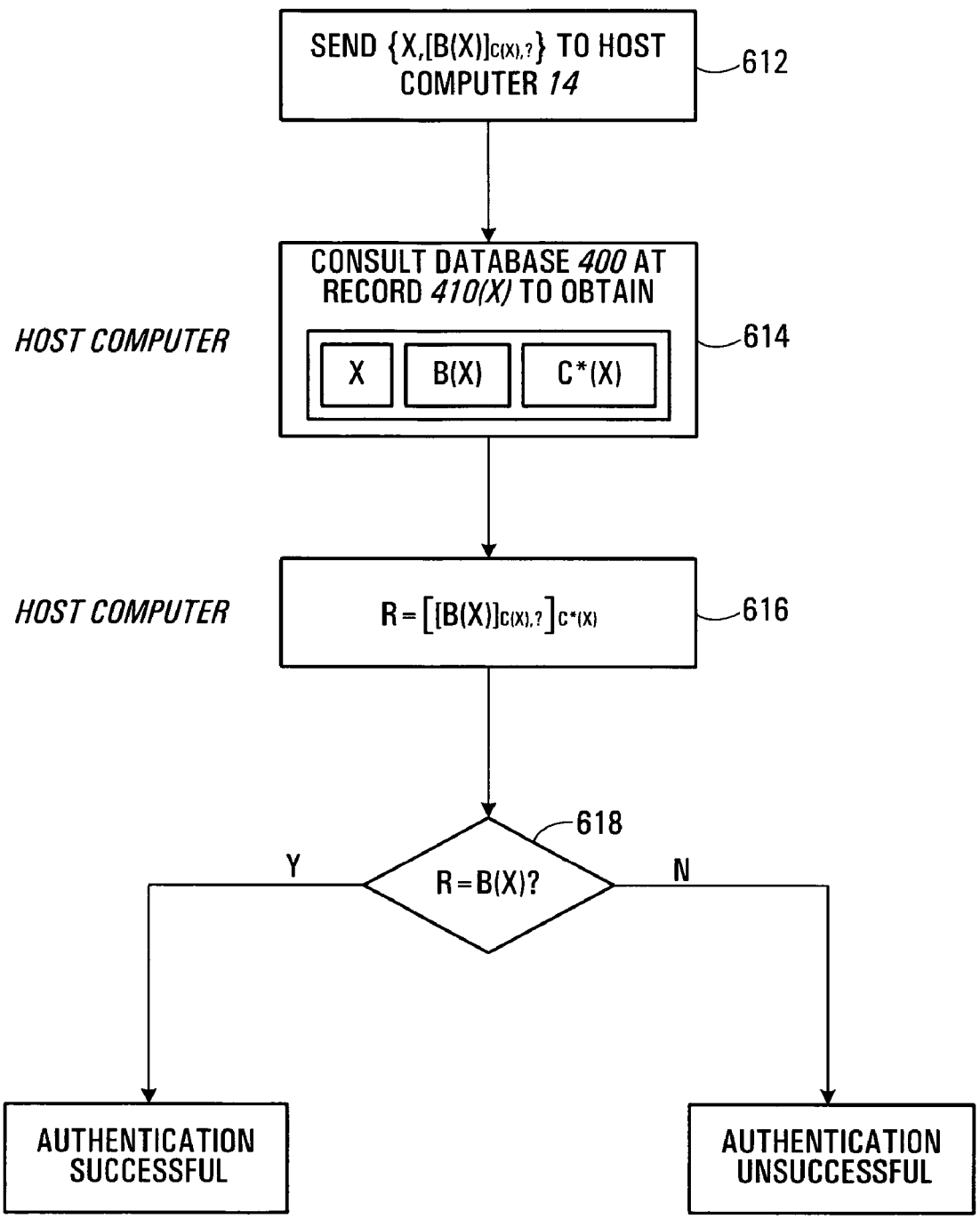
FIGS. 6A and 6B are flowcharts showing steps executed in an authentication stage of a method in accordance with an embodiment of the present invention and a variant thereof.

To this end, the control module 24 proceeds with an authentication phase in one of at least two ways, described now with reference to FIGS. 6A (first scenario) and 6B (second scenario). Naturally, variants of these and still other scenarios are within the scope of the present invention.

At step 612, the control module 24 sends the purported user identifier, X, and the purported encrypted personal identifier, $[B(X)]_{C(X),?}$, to the host computer 14.

At step 614, the host computer 14 accesses the database 400 of potential users, in particular at the record 410(X) corresponding to the purported user identifier, X. Specifically, the host computer 14 consults the field 420(X) to obtain the associated complementary key, C*(X), and consults the field 430(X) to obtain the associated (decrypted) personal identifier, B(X).

At step 616, the host computer 14 attempts to decrypt the purported encrypted personal identifier, $[B(X)]_{C(X),?}$, using the complementary key, C*(X), to obtain a resultant personal identifier, R.

At step 618, the host computer 14 compares the resultant personal identifier, R, to the personal identifier, B(X), previously extracted at step 614.

If there is a match between R and B(X), then this proves that the credentials supplied to the control module 24 in the acquired UTI, D', are authentic, and further allows the control module 24 to conclude that the identification number of the user requesting access is X. However, if there is no match between R and B(X), then the credentials supplied to the control module 24 in the acquired UTI, D', are not authentic. In other words, the format of the acquired UTI, D', was valid to the extent where it presented a valid common identifier, E; however, whatever information was contained in the rest of the acquired UTI did not genuinely identify a potential user.

Figure 6B:
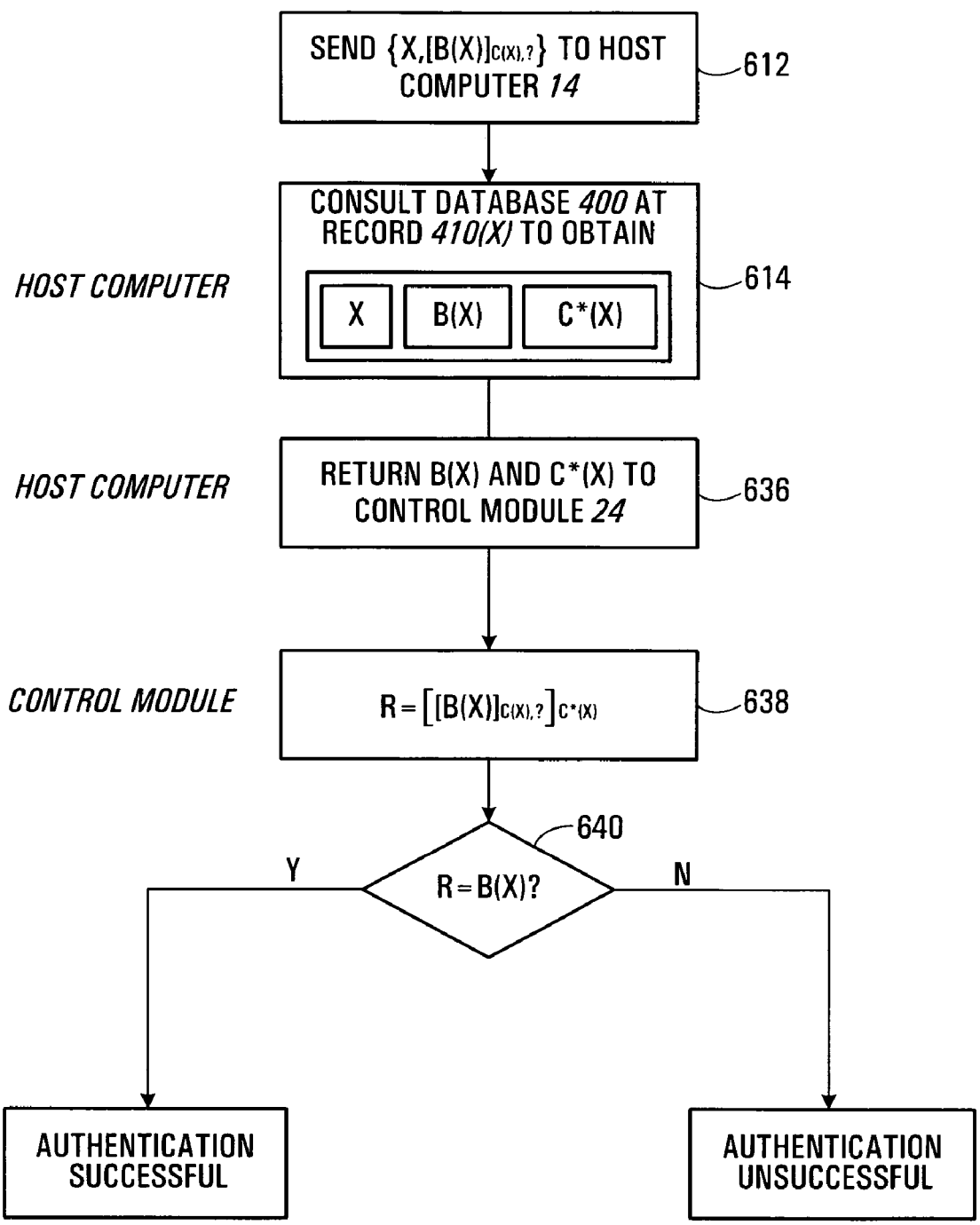

Under a second scenario, shown in FIG. 6B, steps 612-614 above are repeated but steps 616-618 are replaced by the following steps 636-640.

At step 636, the host computer 14 returns the values C*(X) and B(X) to the control module 24.

At step 638, the control module 24 attempts to decrypt the purported encrypted personal identifier, $[B(X)]_{C(X),?}$, using the complementary key, C*(X), to obtain a resultant personal identifier, R.

At step 640, the control module 24 compares the resultant personal identifier, R, to the personal identifier, B(X) received from the host computer 14 at step 636.

If there is a match between R and B(X), then this proves the credentials supplied to the control module 24 in the acquired UTI, D', are authentic, and further allows the control module 24 to conclude that the identification number of the user requesting access is X. However, if there is no match between R and B(X), then the credentials supplied to the control module 24 in the acquired UTI, D', are not authentic. In other words, the format of the acquired UTI, D', was valid to the extent where it presented a valid common identifier, E; however, whatever information was contained in the rest of the acquired UTI did not genuinely identify a potential user.

It will thus be apparent from the above description that the validation phase reduces the effect of "noise" that may be present in a physical area replete with RFID tags. That is to say, queries to the host computer 14 are reserved for those instances where the information acquired from a nearby tag 32 contains the common identifier, E.

Now, in some instances, it may be possible for a malicious user to gain knowledge of the common identifier, E. Under such circumstances, the malicious user may actually pass the validation stage and enable an onslaught against the host computer 14, thus resulting in hacking activity. To guard against this potential hacking threat on the host computer 14, it is within the scope of the present invention to encrypt the entire UTI, D(A), with a second key, denoted K(A).

Figure 8:
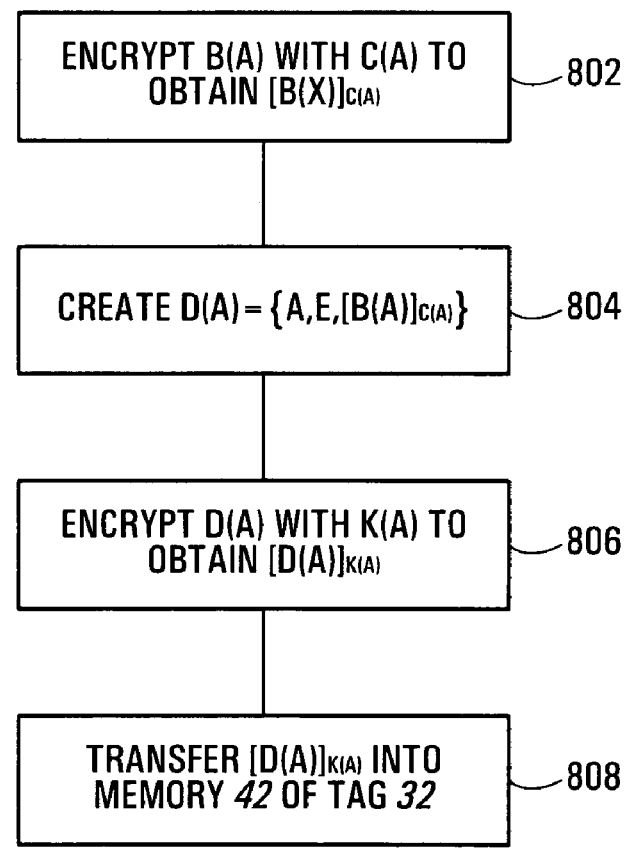
FIG. 8 is a variant of the flowchart in FIG. 3.

Specifically, with reference to FIG. 8, there is shown a variant of the tag programming phase.

Figure 3:
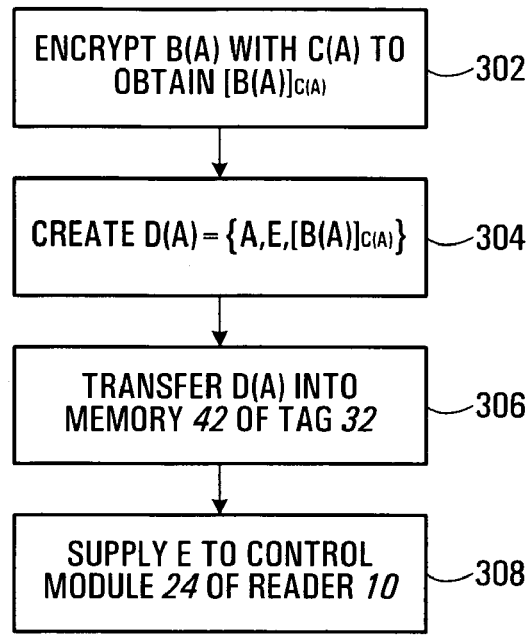
FIG. 3 is a flowchart showing steps executed in a tag programming phase of a method in accordance with an embodiment of the present invention.

At step 802, which is identical to step 302 of FIG. 3, the personal identifier, B(A), is encrypted using a key, C(A), to yield an encrypted personal identifier denoted $[B(A)]_{C(A)}$.

At step 804, a temporary UTI of the user's tag 32 is constructed and denoted D(A). Specifically, the temporary UTI, D(A), will include the encrypted personal identifier, $[B(A)]_{C(A)}$, to which is appended the user identifier, A, and a "common identifier", E, shared by a subset of, or possibly all, potential users of the resource of interest 16.

Step 806 corresponds to a "second" encryption, whereby the temporary UTI, D(A), is encrypted using the second key, K(A). The result of the second encryption is an encrypted UTI, denoted $[D(A)]_{K(A)}$.

At step 808, the programming module 50 transfers the encrypted UTI, $[D(A)]_{K(A)}$, into the memory 42 of the tag 32.

It is noted that the second encryption at step 806 may be performed by the tag programming module 50 upon writing the memory 42 of the microchip 40 in the tag 32. In another embodiment, e.g., where the host computer 14 is responsible for performing the "first" encryption at step 802, the host computer 14 may also perform the second encryption at step 806.

Also, it is noted that the second key, K(A), has a complementary key, K*(A). The complementary key, K*(A), should be known to the control module 24 a priori such that it can rapidly perform the validation phase.

Figure 9:
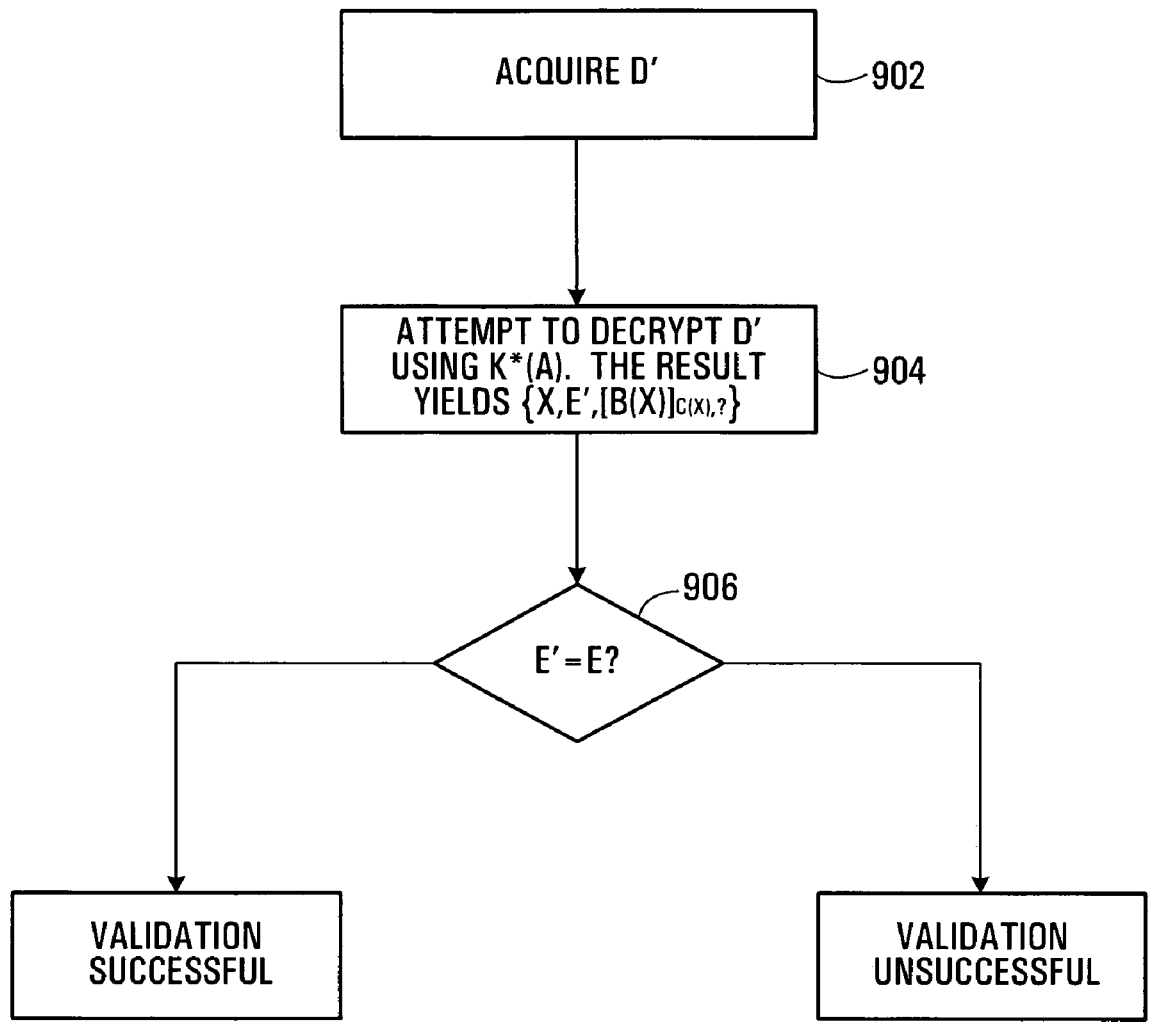
FIG. 9 is a variant of the flowchart in FIG. 5.

Operation of the control module 24 at the reader 10 during the validation phase is now described with reference to FIG. 9. An arbitrary tag 32, comprising an unknown UTI, denoted D', approaches the reader 10, more specifically, the antenna 28 of the reader 10.

At step 902, the reader 10 will function in the usual way to acquire the unknown UTI, D'. If the acquired UTI, D', is to have any chance of passing the validation and authentication phases, it will need to be capable of decryption using the complementary key K*(A), which is known a priori.

At step 904, the control module 24 attempts to decrypt the acquired UTI, D', using the complementary key K*(A). The result yields the following partitioned code: {X, E', $[B(X)]_{C(X),?}$}, where X is a purported user identifier, E' is a purported common identifier and $[B(X)]_{C(X),?}$ is a purported encrypted personal identifier. Again, the word "purported" is used to qualify all the elements of the decrypted version of the acquired UTI, since at this point, the control module 24 does not know whether the decrypted version of the acquired UTI conforms to a UTI that would have been issued by a tag worn by a potential user in the database 400 of potential users.

Step 906 is identical to step 504 of FIG. 5, and consists of the control module 24 comparing the purported common identifier, E', to the known common identifier, E, in order to conclude whether validation was successful or unsuccessful.

In the above, it is noted that it is not sufficient for a malicious user to gain knowledge of the common identifier, E. In addition, the malicious user must know the second key, K(A), used to encrypt the temporary UTI, D(A). Assuming that the second key, K(A), is kept secret or generally inaccessible to malicious users (e.g., behind a firewall at the host computer 14), the only alternative left to the malicious user is to guess the second key, K(A), possibly based on knowledge of the corresponding key, K*(A).

Various techniques are therefore envisaged by the present invention for rendering it difficult for a malicious user to guess the second key, K(A), that was used to obtain the encrypted UTI, $[D(A)]_{K(A)}$. For example, this is achieved by suitable selection of the keys, K(A) and K*(A), as a private key and a public key, respectively. In this way, it is extremely difficult to guess the private key, K(A), from the public key, K*(A), which makes it extremely difficult to pass the validation stage. In fact, even if the validation stage was passed by an extremely unlikely chance event, it would not be possible for a hacker to learn of the success of the validation stage when it occurs.

It will thus be appreciated that successfully authenticating a potential user using the techniques described above reduces the computational load of the host computer 14, reduces the traffic on the link between the reader 10 and the host computer 14, and increases insulation against the threat of hacking.

In addition to the validation and authentication phases described herein above, there is also the issue of authorization, i.e., rendering the final decision as to whether or not to issue the command 18, allowing a potential user to access the resource of interest 16. This may involve additional steps to guard against the effects of stolen tags, etc. For example, various types of authentication techniques envisaged by the present invention include a challenge-response algorithm, a PIN-based mechanism, etc. Any one of these or other methods or combinations of methods can be used without detracting from the spirit of the invention.

In a specific embodiment of a PIN-based mechanism, the potential user associated with the user identifier A has prior knowledge of the personal identifier, B(A). Thus, upon successful authentication of a given potential user based on that potential user's tag 32, the host computer 14 may additionally request that the potential user submit the personal identifier, which is then compared to the personal identifier stored in the table 400 for that potential user. Entry of the personal identifier may be by way of a keypad located at the reader 10, or using a cellular telephone, for example. If the information is a match, then access is granted, otherwise, it is not unlikely that the tag has been stolen from the potential user.

In a variant, a biometric sensor (e.g., fingerprint scanner, iris scanner, etc.) may be located in the vicinity of the reader 10. Upon successful authentication of a given potential user based on that potential user's tag 32, the host computer 14 may additionally request that the potential user submit biometric information, which is then compared to previously known biometric information stored in the table 400 for that potential user. If the information is a match, then access is granted, otherwise, it is not unlikely that the tag has been stolen from the potential user.

It will be understood that still further modifications can be made while remaining within the scope of the present invention. For example, for added security, the key C*(A) used for decryption of the personal identifier (and stored securely at the host computer 14) may be longer than the key C(A) used to encrypt the personal identifier. For instance, C(A) and C*(A) may be complementary public and private keys, respectively, as used in the public key infrastructure (PKI). In this way, because a public key, namely C(A), is used to encrypt the personal identifier, B(A), it is extremely difficult for a malicious user to guess the private key, namely C*(A), required to decrypt the encrypted personal identifier, $[B(A)]_{C(A)}$. Therefore, it will be extremely difficult for a malicious user to fake the credentials of a potential user in the database 400 of potential users.

In yet another embodiment contemplated for use with the present invention is the provision of incorporating specific permissions (or groups of permissions under a user profile) as a field in the database 400 at the host computer 14. The permissions could be obtained at step 614 described herein above, at the same time as the complementary key, C*(X). In another embodiment, specific permissions (or groups of permissions under a user profile) in the form of a code could even be built into the personal identifier B(A) or as a separate field that is encrypted by the key, C(A). As there is little danger of a hacker guessing the employee ID, there is similarly little danger of the hacker guessing the associated permissions. Moreover, as the size of the memory 42 on commercially available devices increases, so it may become increasingly advantageous to store profiles and other sensitive information (such as credit card information, driver's license information, medical insurance information, social security and citizenship information, etc.) alongside the personal identifier B(A), and subject to encryption by the key C(A) and the second key, K(A).

It will be appreciated that the expressions "reader", "tag" and RFID have been employed generally to refer to technology based on non-contact interrogation and response, without limitation to any particular standard or frequency range or mode of operation (e.g., near-field or far-field, active or passive, etc.). While the present invention envisages that readers and tags may be standards-compliant, such compliance is not required for the operation, understanding or implementation of the present invention.

Those skilled in the art will appreciate that in some embodiments, the functionality of one or more of the control module 24, the host computer 14, and the microchip 40 may be implemented as pre-programmed hardware or firmware elements (e.g., application specific integrated circuits (ASICs), electrically erasable programmable read-only memories (EEPROMs), etc.), or other related components. In other embodiments, these components may be implemented as an arithmetic and logic unit (ALU) having access to a code memory (not shown) which stores program instructions for the operation of the ALU. The program instructions could be stored on a medium which is fixed, tangible and readable directly by the component in question, (e.g., removable diskette, CD-ROM, ROM, or fixed disk), or the program instructions could be stored remotely but transmittable to the component in question via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method, comprising:
 receiving, at a contact-less tag reader, first data transmitted by a tag;
 validating the first data to determine whether the first data comprises candidate data for authentication, the validating being deemed successful if the first data comprises candidate data for authentication, and unsuccessful otherwise;
 responsive to the validating being deemed successful, authenticating the candidate data;
 wherein said validating comprises:
  extracting from the first data an identifier and second data;
  comparing the identifier to a predetermined reference identifier; and
  concluding that the first data comprises candidate data for authentication if the identifier matches the predetermined reference identifier.

2. The method defined in claim 1, further comprising:
 broadcasting a query signal;
 wherein the first data transmitted by the tag is in response to the query signal.

3. The method defined in claim 1, wherein the tag is an RFID tag.

4. The method defined in claim 1, wherein the candidate data for authentication is the second data.

5. The method defined in claim 4, wherein the step of validating further comprises:
 concluding that the first data does not comprise candidate data for authentication if the identifier does not match the predetermined reference identifier.

6. The method defined in claim 1, wherein the step of extracting from the first data an identifier and second data comprises applying decryption to the first data.

7. The method defined in claim 6, wherein the first data is encrypted with an encryption key and wherein applying decryption to the first data comprises decrypting the first data using a decryption key associated to the encryption key.

8. The method defined in claim 7, further comprising obtaining the decryption key prior to receiving the first data.

9. The method defined in claim 8, further comprising obtaining the predetermined reference identifier prior to receiving the first data.

10. The method defined in claim 7, wherein the encryption key is longer than the decryption key.

11. The method defined in claim 10, wherein the encryption key is a private key and wherein the decryption key is a public key.

12. The method defined in claim 1, wherein the second data comprises a first portion corresponding to an index and a second portion corresponding to an encrypted version of third data.

13. The method defined in claim 12, wherein the step of authenticating the candidate data comprises:
applying decryption to the second portion of the second data to obtain the third data;
consulting a database at a location associated with the index to obtain fourth data;
comparing the third and fourth data;
deeming authentication to be successful if the third data matches the fourth data, and unsuccessful otherwise.

14. The method defined in claim 13, wherein the first data is encrypted with a first encryption key, wherein the step of extracting from the first data an identifier and second data comprises decrypting the first data using a first decryption key associated to the first encryption key, and wherein the encrypted version of the third data comprises the third data as encrypted by a second encryption key.

15. The method defined in claim 14, wherein applying decryption to the second portion of the second data comprises decrypting the second portion of the second data using a second decryption key associated to the second encryption key.

16. The method defined in claim 15, wherein the second encryption key is shorter than the second decryption key.

17. The method defined in claim 16, wherein the second encryption key is a public key and wherein the second decryption key is a private key.

18. The method defined in claim 13, further comprising:
receiving an indication of an action desired to be performed by a user;
verifying access privileges associated with the user;
allowing the user to perform the action if the action is within the access privileges associated with the user.

19. The method defined in claim 13, wherein the third data is indicative of access privileges associated with a user, the method further comprising:
receiving an indication of an action desired to be performed by the user; and
allowing the user to perform the action if the action is within the access privileges associated with the user.

20. The method defined in claim 13, wherein responsive to successful authentication, a user is permitted to perform a local action.

21. The method defined in claim 20, wherein the local action is one of activating a vehicle function, opening a door, accessing a computer, accessing a computer network or effecting a financial transaction.

22. The method defined in claim 13, wherein responsive to unsuccessful authentication, a user is prevented from performing a local action.

23. The method defined in claim 22, wherein the local action is one of activating a vehicle function, opening a door, accessing a computer, accessing a computer network or effecting a financial transaction.

24. The method defined in claim 13, further comprising, responsive to authentication being deemed successful, confirming the authentication using keyed-in data entered by a user.

25. The method defined in claim 24, wherein confirming the authentication comprises:
receiving the keyed-in data entered by the user;
consulting the database at the location associated with the index to obtain fifth data;
comparing the keyed-in data to the fifth data;
confirming authentication if the keyed-in data matches the fifth data.

26. The method defined in claim 25, wherein the keyed-in data is entered by the user via a keyboard located in proximity to the contact-less tag reader.

27. The method defined in claim 25, wherein the keyed-in data is entered by the user via a mobile phone.

28. The method defined in claim 24, wherein confirming the authentication comprises:
receiving the keyed-in data entered by the user;
comparing the keyed-in data to the fourth data;
confirming authentication if the keyed-in data matches the fourth data.

29. The method defined in claim 12, wherein the step of authenticating the candidate data comprises transmitting the second portion of the second data to a server adapted to:
apply decryption to the second portion of the second data to obtain the third data;
consult a database at a location associated with the index to obtain fourth data;
perform a comparison of the third and fourth data;
return a result of the comparison.

30. The method defined in claim 29, wherein the step of authenticating the candidate data further comprises deeming authentication to be successful if the result of the comparison indicates that the third data matches the fourth data, and unsuccessful otherwise.

31. The method defined in claim 30, wherein responsive to successful authentication, a user is permitted to perform a local action.

32. The method defined in claim 31, wherein the local action is one of activating a vehicle function, opening a door, accessing a computer, accessing a computer network or effecting a financial transaction.

33. The method defined in claim 30, wherein responsive to unsuccessful authentication, a user is prevented from performing a local action.

34. The method defined in claim 33, wherein the local action is one of activating a vehicle function, opening a door, accessing a computer, accessing a computer network or effecting a financial transaction.

35. The method defined in claim 29, further comprising:
receiving an indication of an action desired to be performed by a user;
verifying access privileges associated with the user;
allowing the user to perform the action if the action is within the access privileges associated with the user.

36. The method defined in claim 29, wherein the third data is indicative of access privileges associated with a user, the method further comprising:
receiving an indication of an action desired to be performed by the user; and
allowing the user to perform the action if the action is within the access privileges associated with the user.

37. A method of programming a tag, comprising:
determining a user identifier associated with a user of the tag;

determining a personal identifier associated with the user of the tag;

encrypting the personal identifier with an encryption key to produce an encrypted personal identifier;

determining a common identifier jointly associated with the user of the tag and other users of other tags;

creating a unique tag identifier (UTI), the UTI comprising the user identifier, the encrypted personal identifier and the common identifier;

storing the UTI in a memory of the tag.

38. The method defined in claim 37, wherein a priori knowledge of the common identifier allows a processing entity that is provided with the common identifier to validate the tag without contacting a host.

39. The method defined in claim 37, the encryption key being associated with a decryption key, wherein a priori knowledge of (I) the personal identifier associated with the user; (II) the user identifier associated with the user; and (III) the decryption key, allows a processing entity provided with the user identifier and a result of decrypting the encrypted personal identifier using the decryption key to authenticate the tag.

40. The method defined in claim 37, further comprising:
encrypting the UTI before storing in the memory of the tag.

41. Computer-readable media tangibly embodying a program of instructions executable by a host computer to perform a method of authenticating tag data that has been validated on a basis of an identifier in the tag data, the tag data further comprising second data, the second data having a first portion corresponding to an index and a second portion corresponding to an encrypted version of third data, the method comprising:

applying decryption to the second portion of the second data to obtain the third data;

consulting a database at a location associated with the index to obtain fourth data;

comparing the third and fourth data;

deeming authentication to be successful if the third data matches the fourth data, and unsuccessful otherwise.

42. A memory storing first data for transmission by a radio frequency tag to a reader, the first data comprising an identifier and second data, the identifier being known to the reader and allowing the reader to validate the tag without contacting a host, the second data comprising a first portion corresponding to an index and a second portion corresponding to an encrypted version of third data, the third data and the index being known to the host and allowing the host to authenticate the tag upon performing decryption of the second portion of the second data.

43. A radio frequency tag, comprising:
the memory defined in claim 42;
an antenna;
a transponder operative to send a signal through the antenna, the signal being representative of the first data stored in the memory.

44. The radio frequency tag defined in claim 43, wherein the transponder is operative to send the signal in response to receipt of a query signal through the antenna.

45. A signal tangibly embodied in a transmission medium and transmitted by a radio frequency tag, the signal comprising first data, the first data comprising an identifier and second data, the identifier being known to a reader of the tag and allowing the reader to validate the tag without contacting a host, the second data comprising a first portion corresponding to an index and a second portion corresponding to an encrypted version of third data, the third data and the index being known to the host and allowing the host to authenticate the tag upon performing decryption of the second portion of the second data.

46. The signal defined in claim 45, wherein the first data is in an encrypted form.

47. Computer-readable media tangibly embodying a program of instructions executable by a contact-less tag reader to perform a method, the method comprising:

receiving first data transmitted by a tag;

validating the first data to determine whether the first data comprises candidate data for authentication, the validating being deemed successful if the first data comprises candidate data for authentication, and unsuccessful otherwise;

responsive to the validating being deemed successful, authenticating the candidate data;

wherein said validating comprises:

extracting from the first data an identifier and second data;

comparing the identifier to a predetermined reference identifier; and concluding that the first data comprises candidate data for authentication if the identifier matches the predetermined reference identifier.

48. A contact-less tag reader, comprising:

an antenna;

a broadcast interface for receiving a signal through the antenna, the signal comprising first data transmitted by a tag;

a control module connected to the broadcast interface, the control module being operative for:

validating the first data to determine whether the first data comprises candidate data for authentication, the validating being deemed successful if the first data comprises candidate data for authentication, and unsuccessful otherwise;

responsive to the validating being deemed successful, causing authentication of the candidate data to be performed;

wherein said validating comprises:

extracting from the first data an identifier and second data;

comparing the identifier to a predetermined reference identifier; and concluding that the first data comprises candidate data for authentication if the identifier matches the predetermined reference identifier.

49. The contact-less tag reader defined in claim 48, wherein the signal comprising first data transmitted by a tag is received in response to broadcasting of a query signal through the antenna.

* * * * *